(12) United States Patent
Umemoto et al.

(10) Patent No.: US 6,642,976 B2
(45) Date of Patent: Nov. 4, 2003

(54) GLASS SUBSTRATE AND LIQUID-CRYSTAL DISPLAY DEVICE

(75) Inventors: Seiji Umemoto, Osaka (JP); Toshihiko Ariyoshi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 71 days.

(21) Appl. No.: 09/973,823

(22) Filed: Oct. 11, 2001

(65) Prior Publication Data

US 2002/0060772 A1 May 23, 2002

(30) Foreign Application Priority Data

Oct. 11, 2000 (JP) .......................................... 2000-309989

(51) Int. Cl.⁷ ............................................ G02F 1/1335
(52) U.S. Cl. ............................. 349/65; 349/84; 349/158
(58) Field of Search ............................. 349/56, 65, 84, 349/158

(56) References Cited

U.S. PATENT DOCUMENTS 5,452,385 A    9/1995  Izumi et al.
5,808,713 A  * 9/1998  Broer et al. .................. 349/98

FOREIGN PATENT DOCUMENTS

EP    1 154 306 A1   11/2001
JP    5-158033       6/1993    .......... G02F/1/1335

OTHER PUBLICATIONS

Patent Abstract of Japan 05–158033, Jun. 25, 1993.

* cited by examiner

Primary Examiner—Alexander Ghyka
(74) Attorney, Agent, or Firm—Sughrue Mion, PLLC

(57) ABSTRACT

A glass substrate is constituted by a transparent glass plate, a transparent layer with a refractive index lower than that of the transparent glass plate, and an electrically conductive layer disposed on the transparent glass plate through the low-refractive-index transparent layer. A liquid-crystal display panel includes a liquid-crystal cell having a visual side cell substrate, a back side cell substrate, an electrode provided on the visual side cell substrate, an electrode provided on the back side cell substrate, and liquid crystal held between the visual side cell substrate and the back side cell substrate which are disposed so that the electrode sides of the two cell substrates face each other. A liquid-crystal display device is constituted in such a manner that at least one of the visual side and back side cell substrates is constituted by the glass substrate.

9 Claims, 4 Drawing Sheets

GLASS SUBSTRATE AND LIQUID-CRYSTAL DISPLAY DEVICE

BACKGROUND OF THE INVENTION

1. Field of the Invention

The present invention relates to a glass substrate by which light incident on a side surface can be transmitted rearward efficiently, and a transmission type or transmission-reflection type liquid-crystal display device using the glass substrate as a cell substrate and excellent in display quality.

The present application is based on Japanese Patent Application No. 2000-309989, which is incorporated herein by reference.

2. Description of the Related Art

Greater reduction in thickness, size and weight of liquid-crystal display devices has been demanded for the purpose of suppressing increase in weight which is accompanied by increase in size of television and personal computer display screens, for the purpose of reducing in size and weight of portable personal computers and portable telephone sets, etc. In the meanwhile, it is however difficult to reduce thickness, size and weight of a liquid-crystal display device if the display device is provided with a background-art front light 8 or a background-art backlight 8 including a side light pipe 83 as shown in FIGS. 5 to 7. Incidentally, the side light pipe is set to have a thickness not smaller than 1 mm for meeting the requirement of light transmission. When a light diffusing plate, a reflection plate, a prism sheet, etc. are disposed on the side light pipe, the total thickness generally reaches a vale of not smaller than 3 mm. Incidentally, the reference numeral 81 designates a light source; and 82, a light source holder.

Upon the aforementioned circumstances, there has been proposed a reflection type liquid-crystal display device in which a light source is disposed on one of side surfaces of a liquid-crystal display panel so that illumination light incident on the side surface is totally reflected in a visual side cell substrate while being transmitted in the whole panel and so that the reflected light is scattered on a roughened surface type reflection plate so as to be used for display (Unexamined Japanese Patent Publication No. Hei. 5-158033). This proposal aims at making the liquid-crystal panel also play the role of a side light pipe to omit the light pipe to thereby achieve reduction in thickness and weight of the liquid-crystal display device. Incidentally, light is transmitted in the whole liquid-crystal display panel, and particularly, the light is mainly transmitted in the cell substrate of the liquid-crystal cell.

It is however found that a background-art glass substrate satisfying performance requirements such as transparency, heat resistance, chemical resistance, surface smoothness, gas barrier characteristic, etc. has a problem that the difference between brightness and darkness is large on the panel surface because the glass substrate lacks light transmission efficiency so that display becomes darker as the position of display goes farther from the light source.

SUMMARY OF THE INVENTION

An object of the present invention is to provide a glass substrate in which light incident on a side surface can be transmitted rearward efficiently while full use of the merit of thin and lightweight characteristic can be made, and to develop a transmission type or transmission-reflection type liquid-crystal display device excellent in luminance and uniformity of luminance and good in display quality.

According to the present invention, there is provided a glass substrate constituted by a transparent glass plate, a transparent layer with a refractive index lower than that of the transparent glass plate, and an electrically conductive layer disposed on the transparent glass plate through the low-refractive-index transparent layer. There is further provided a liquid-crystal display device constituted by a liquid-crystal display panel including a liquid-crystal cell having a visual side cell substrate, aback side cell substrate, an electrode provided on the visual side cell substrate, an electrode provided on the back side cell substrate, and liquid crystal held between the visual side cell substrate and the back side cell substrate which are disposed so that the electrode sides of the two cell substrates face each other, wherein at least one of the visual side and back side cell substrates is constituted by the glass substrate.

Light incident on a side surface is confined in the glass substrate according to the present invention because of the light totally reflected by the low-refractive-index transparent layer so that the light can be efficiently transmitted (rearward) toward an opposite side surface to the incidence side surface. Moreover, the glass substrate is thin in thickness and light in weight because the weight of the glass substrate is increased only by the added weight of the low-refractive-index transparent layer. As a result, when a liquid-crystal cell is formed by use of the glass substrate as a cell substrate, incident light from a light source disposed on one of side surfaces of a liquid-crystal display panel can be transmitted rearward efficiently through the substrate. When the optical path of the transmitted light is changed to a viewing direction through suitable optical path changing means, good display quality can be achieved so that the whole display screen is bright and excellent uniformity of brightness is obtained. Moreover, a liquid-crystal display device thin in thickness can be formed when the light source is disposed on a side surface.

In the above description, if no low-refractive-index transparent layer is provided, the transmitted light in the panel enters a liquid-crystal layer or a color filter layer generally disposed adjacently to the liquid-crystal layer. As a result, the absorbed component of light into the liquid-crystal layer may increase because of birefringence of the liquid-crystal layer when the light enters a polarizer, or the rearward transmission efficiency may be lowered remarkably because of light absorption into the color filter layer. As a result, the display screen becomes darker as the position of display goes farther from the light source, so that uniformity of luminance is spoiled greatly to make it difficult to view the display.

Features and advantages of the invention will be evident from the following detailed description of the preferred embodiments described in conjunction with the attached drawings.

DETAILED DESCRIPTION OF THE PREFERRED EMBODIMENTS

Figure 1:
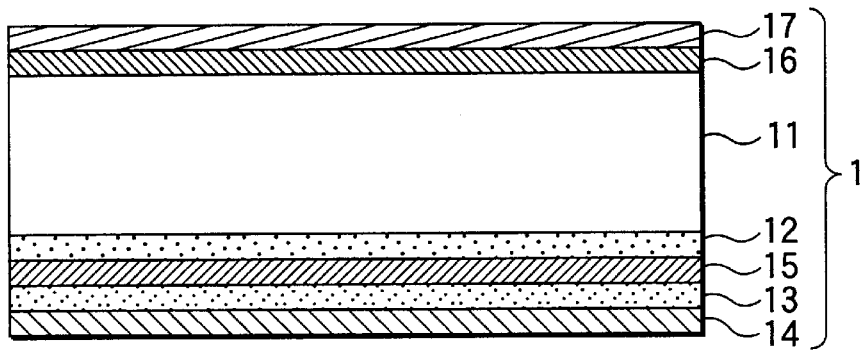
FIG. 1 is a sectional view of an example of a glass substrate.

The glass substrate according to the present invention is constituted by a transparent glass plate, a transparent layer with a refractive index lower than that of the transparent glass plate, and an electrically conductive layer disposed on the transparent glass plate through the low-refractive-index transparent layer. FIG. 1 shows an example of the glass substrate 1. The glass substrate 1 is constituted by a transparent glass plate 11, a low-refractive-index transparent layer 12, an electrically conductive layer 13, an oriented film 14, a color filter layer 15, a gas barrier layer 16, and a hard coat layer 17.

A suitable material applied to a background-art cell substrate or the like can be used as the transparent glass plate without any specific limitation. Especially, a material excellent in transparency such as white glass transparent to blue glass is preferred from the point of view of illumination light transmission property, display light transmission property, etc. On the other hand, a material excellent in optical isotropy, surface smoothness, etc. is preferred from the point of view of suppressing birefringence in a light-transmitting direction and in a direction of the thickness of the transparent glass plate as greatly as possible to thereby reduce light loss, etc.

The thickness of the transparent glass plate is not particularly limited and may be determined suitably in accordance with the strength or the like which meets the purpose of use. When the transparent glass plate is used as a cell substrate, the thickness is generally determined to be in a range of from 20 $\mu$m to 5 mm, particularly in a range of from 50 $\mu$m to 2 mm, more particularly in a range of from 100 $\mu$m to 1 mm, from the point of view of balance among liquid crystal-encapsulating strength, light-transmitting efficiency, and reduction in thickness and weight. Particularly when the transparent glass plate is used as a substrate for transmitting incident light from a light source, the sectional area of the transparent glass plate is advantageously selected to be as large as possible, from the point of view of light-inputting efficiency, transmission efficiency, etc. Hence, the transparent glass plate is preferably selected to be as thick as possible.

On the other hand, the transparent glass plate is advantageously selected to be as thin as possible, from the point of view of reduction in thickness and weight. Incidentally, the transparent glass plate may be a uniform-thickness plate or may be a plate having a thickness partially different in accordance with position. When the transparent glass plate is used as the aforementioned transmission substrate, a plate having a thickness partially different in accordance with position, such as a plate having a section shaped like a wedge or the like in the light-transmitting direction may be used advantageously from the point of view of improving efficiency of incidence of transmitted light on the plate through oblique arrangement of optical path changing means.

The low-refractive-index transparent layer provided on at least one side of the transparent glass plate is provided as a layer having a refractive index lower than that of the transparent glass plate. As represented by the broken-line arrow $\alpha 0'$ in FIG. 8, light incident on one of side surfaces of the transparent glass plate 11 from a light source 7 or the like is confined in the transparent glass plate 11 efficiently by total reflection based on the refractive index difference between the glass plate 11 and the transparent layer 12 when the incident light is transmitted in the transparent glass plate (cell substrate) 11. That is, the low-refractive-index transparent layer is provided for the purpose of confining the transmitted light in the transparent glass plate and transmitting the transmitted light (rearward) toward an opposite side surface to the above-mentioned incidence side surface of the transparent glass plate.

When the transparent glass plate together with the low-refractive-index transparent layer is used as a cell substrate, the low-refractive-index transparent layer is provided for preventing the transmitted light entering the liquid-crystal layer from suffering birefringence or scattering and, accordingly, for preventing the transmitted light from being reduced or becoming uneven because of the partial change of the transmission state. As a result, the low-refractive-index transparent layer prevents display from becoming darker and prevents display near the light source from being ghosted in the back to lower the display quality.

When a color filter or the like is further disposed on the cell substrate, the low-refractive-index transparent layer is provided for avoiding reduction of the transmitted light by preventing the transmitted light from being absorbed to the color filter rapidly. When incident light from the light source is transmitted in a liquid-crystal layer of a liquid-crystal display device as disclosed in Unexamined Japanese Patent Publication No. Hei. 5-158033, the transmitted light is scattered on the liquid-crystal layer so as to get into an uneven transmission state, and unevenness or ghosting of emitting light occurs to make it difficult to view the display image.

The low-refractive-index transparent layer can be formed out of a suitable material such as an inorganic or organic low-refractive-index dielectric with a refractive index lower than that of the transparent glass plate by a suitable system such as a vacuum vapor deposition system, a spin coating system, or the like. The material and the system for forming the low-refractive-index transparent layer are not particularly limited. When the transparent glass plate together with the low-refractive-index transparent layer is used as the cell substrate, a low-refractive-index transparent layer of an inorganic dielectric is preferably used from the point of view of stability at the time of forming an electrode, etc.

As the refractive index difference between the transparent layer and the transparent glass plate increases, it becomes more advantageous from the point of view of rearward transmission efficiency due to enlargement of the angle range for total reflection, etc. The refractive index difference is preferably selected to be not smaller than 0.05, more preferably not smaller than 0.1, further preferably in a range of from 0.12 to 0.5. In the case where the transparent glass plate together with the transparent layer is used as a cell substrate, even the aforementioned refractive index difference of between the transparent glass plate with the transparent layer has little influence on display quality in a reflection mode using external light. Incidentally, when the refractive index difference is 0.1, the factor of reflection of external light in the interface between the transparent glass plate and the transparent layer is not larger than 0.1%. As a result, lowering of brightness or contrast due to the reflection loss of the external light is very slight.

As illustrated in FIG. 1, the low-refractive-index transparent layer 12 is disposed between the transparent glass plate 11 and the electrically conductive layer 13 from the point of view of the effect of confining the transmitted light in the transparent glass plate 11, from the point of view of preventing the transmitted light from entering the liquid-crystal layer when the transparent glass plate 11 is used as the cell substrate, etc. When a color filter layer 15 is disposed between the transparent glass plate 11 and the electrically conductive layer 13 as illustrated in FIG. 1, the low-refractive-index transparent layer 12 is preferably positioned nearer the glass plate 11 than the color filter layer 15 from the point of view of preventing the absorption loss of the transmitted light from being caused by the color filter. Therefore, the low-refractive-index transparent layer 12 is generally provided directly on the transparent glass plate 11. In this case, the fact that the surface of the transparent glass plate on which the transparent layer is provided is as smooth as possible, that is, the fact that the transparent layer is as smooth as possible, is favorable to prevention of scattering of the transmitted light. In addition, when the transparent glass plate together with the transparent layer is as the cell substrate, the fact is also preferable from the point of view of avoiding influence on display light.

If the low-refractive-index transparent layer is too thin, the confinement effect maybe reduced because of a wave effusion phenomenon. Therefore, the low-refractive-index transparent layer is preferably selected to be as thick as possible from the point of view of sustaining the total reflection effect. The thickness can be determined suitably from the point of view of the total reflection effect or the like. Generally, the thickness is selected preferably to be not smaller than a quarter wavelength (100 nm), more preferably to be not smaller than half a wavelength (190 nm), further preferably to be not smaller than one wavelength (380 nm), still further preferably to be not smaller than 600 nm, on the basis of the optical path length calculated by multiplying the refractive index of the low-refractive-index transparent layer by the layer thickness thereof, from the point of view of the total reflection effect on the visible light with the wavelength in a range of from 380 nm to 780 nm, particularly on the light with the short-wave side wavelength 380 nm.

The electrically conductive layer provided on the transparent glass plate through the low-refractive-index transparent layer may be made from a suitable material in accordance with the purpose of use of the glass substrate such as prevention of electrification, electromagnetic wave shielding, etc. For example, an electrode, alight-reflection layer or an electrode serving also as a light-reflection layer may be used as the electrically conductive layer when the glass plate is used as the cell substrate. Hence, the electrically conductive layer can be formed, as a transparent layer of ITO (indium-tin oxide) or the like or as an opaque layer such as a light reflection layer of a metal thin film or the like, from a suitable material in accordance with the background art.

The glass substrate according to the present invention can be used for various kinds of purposes in accordance with the background art. Particularly the glass substrate is excellent in the rearward transmission efficiency of the light incident on the side surface as described above. Hence, the glass substrate can be preferably used as a cell substrate in a liquid-crystal cell for the purpose of making light incident on a side surface and transmitting the light rearward. To put the glass substrate into practical use, at least one suitable functional layer such as a color filter layer 15, a gas barrier layer 16 or a hard coat layer 17 as shown in FIG. 1 maybe provided in a suitable position as occasion demands.

Figure 2:
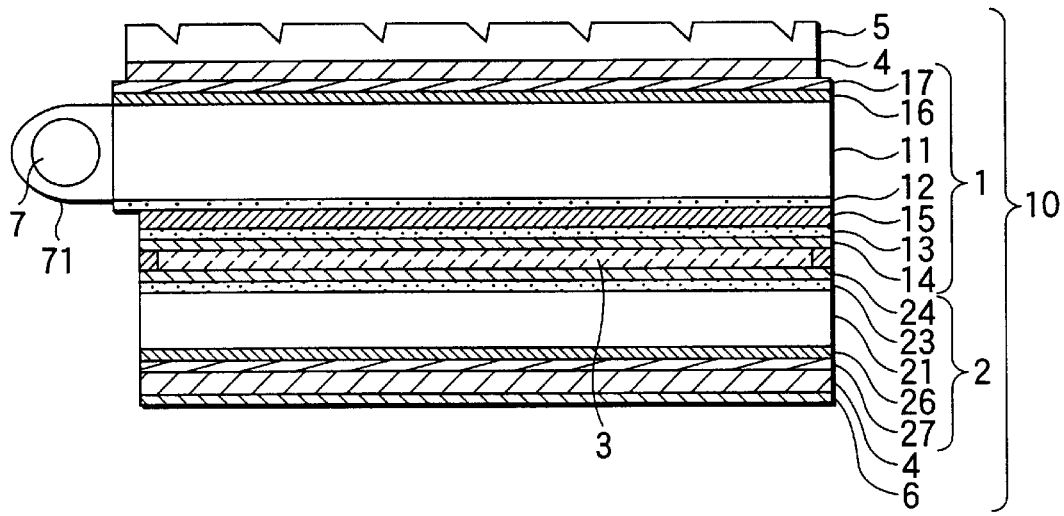
FIG. 2 is a sectional view of an example of a liquid-crystal display device.

The color filter layer 15 is provided for coloration of liquid-crystal display or the like. The color filter layer 15 is generally disposed between the low-refractive-index transparent layer 12 and the electrically conductive film 13 as described above. In the case of a liquid-crystal cell substrate, an oriented film 14 of a rubbed film or the like for aligning liquid crystal maybe provided. The oriented film is generally formed on the electrically conductive film 13 formed as an electrode as illustrated in FIG. 1. Incidentally, in the case of a cell substrate, the gas barrier layer is generally provided in a position outside the cell, and the hard coat layer is generally provided on an outer surface than the cell as shown in FIG. 2.

Figure 3:
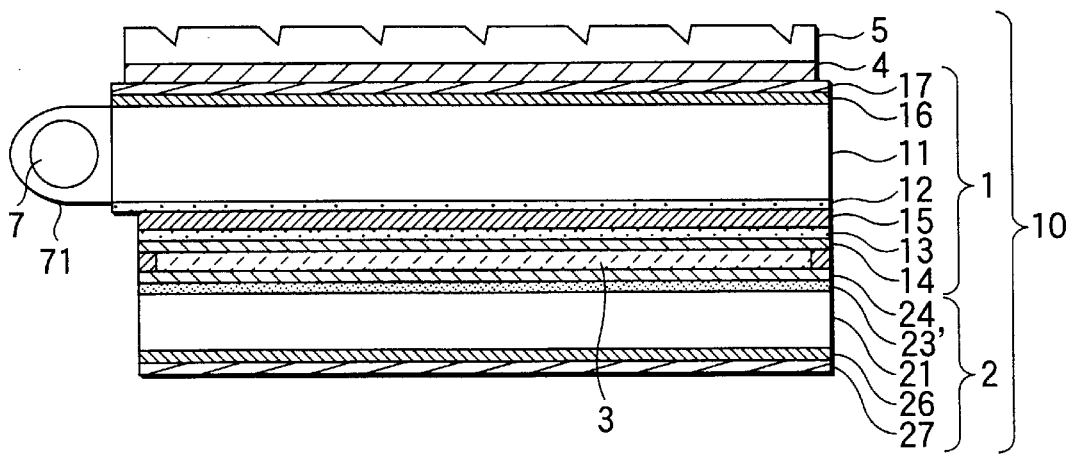
FIG. 3 is a sectional view of another example of the liquid-crystal display device.
Figure 4:
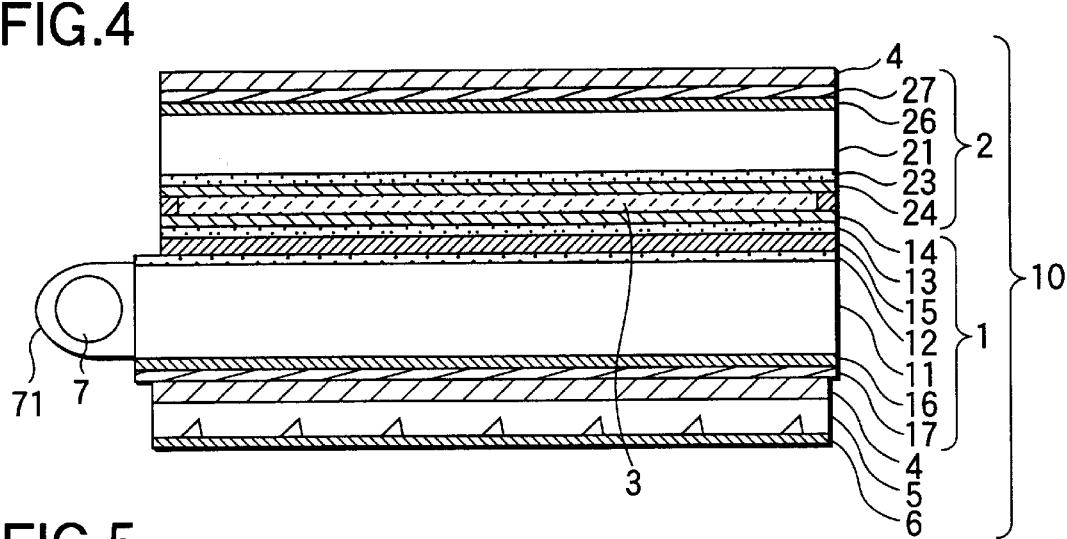
FIG. 4 is a sectional view of a further example of the liquid-crystal display device.

The liquid-crystal display device according to the present invention comprises a liquid-crystal display panel at least including a liquid-crystal cell having a visual side cell substrate, a back side cell substrate, an electrode provided on the visual side cell substrate, an electrode provided on the back side cell substrate, and liquid crystal held between the visual side and back side cell substrates with the electrodes facing each other. In addition, in the liquid-crystal display device according to the present invention, a glass substrate containing the low-refractive-index transparent layer is used as at least one of the visual side and back side cell substrates. FIGS. 2 to 4 show an example of the liquid-crystal display device. The reference numeral 10 designates a liquid-crystal display panel; 1, a visual side substrate constituted by a glass substrate containing a low-refractive-index transparent layer; 2, a back side substrate opposite to the visual side substrate; and 3, a liquid-crystal layer. Further, the reference numeral 21 designates a cell substrate; 23, an electrode; 24, an oriented film; 26, a gas barrier layer; and 27, a hard coat layer.

The kind of the liquid-crystal display panel 10 is not particularly limited except that the liquid-crystal display panel includes a liquid-crystal cell using the aforementioned glass substrate containing the low-refractive-index transparent layer as at least one of the cell substrates. That is, a suitable panel may be used as the liquid-crystal display panel 10. Incidentally, specific examples of the liquid-crystal display panel on the basis of the format of orientation of liquid crystal are: a twisted or non-twisted liquid-crystal display panel such as a TN liquid-crystal display panel, an STN liquid-crystal display panel, a perpendicularly aligned liquid-crystal display panel, an HAN liquid-crystal display panel or an OCB liquid-crystal display panel; a guest-host or ferroelectric liquid-crystal display panel; a light-diffuse liquid-crystal display panel; and soon. Further, a system for driving the liquid crystal may be also a suitable one, such as an active matrix system, a passive matrix system, or the like. The liquid crystal is typically driven through the electrodes 13 and 23 provided on the inner sides of the pair of cell substrates 1 and 2 as illustrated in FIG. 2.

Incidentally, when one of the visual side and back side cell substrates uses the glass substrate according to the present invention while the other substrate does not, the other substrate may be made from a suitable material such as glass, resin or the like. Use of a resin substrate is advantageous from the point of view of lightweight characteristic. Incidentally, examples of the resin may include: acetate resin, polyester resin, polyether sulfone resin, polycarbonate resin, polyamide resin, polyimide resin, polyolefin resin, acrylic resin, polyether resin, polyvinyl chloride resin, styrene resin, or norbornane resin; thermoset or ultraviolet-curing resin such as acrylic resin, urethane resin, acrylic-urethane resin, epoxy resin, silicon resin, or the like; etc.

The other cell substrate needs to be a transparent substrate when it needs to transmit illumination light, display light or the like. However, when the other cell substrate is not required to transmit the light, for example, in a reflection type liquid-crystal cell containing an electrode serving also as a reflection layer, the other cell substrate maybe an opaque substrate. Incidentally, the liquid-crystal display panel illustrated in FIG. 2 is constituted by a transmission type liquid-crystal cell including the visual side and back side cell substrates 11 and 21 and the electrodes 13 and 23 of transparent layers provided inside the cell substrates 11 and 21 respectively. In addition, the liquid-crystal display panel illustrated in FIG. 2 is a front-light transmission-reflection type liquid-crystal panel in which a reflection layer 6 is disposed on the back surface side of the liquid-crystal cell using the glass substrate 1 according to the present invention as the visual side substrate.

The liquid-crystal display panel illustrated in FIG. 3 comprises a reflection type liquid-crystal cell in which an electrode 23' provided on the inner side of the back side substrate is constituted by a metal thin film serving also as a light-reflection layer. The liquid-crystal display panel of FIG. 3 is a front-light transmission-reflection type liquid-crystal display panel. Hence, in the transmission-reflection type liquid-crystal display panel shown in FIG. 3, the back side substrate maybe an opaque substrate as described above because the back side substrate is not required to transmit light. However, FIG. 3 shows the case where the transparent substrate 21 is used as the back side substrate. Further, when a gas shielding substrate or a mar-proof substrate is used as the back side substrate, the gas barrier layer 26 and the hard coat layer 27 illustrated in FIG. 3 may be omitted to thereby more reduce the thickness of the liquid-crystal display device, or the like.

On the other hand, the liquid-crystal display panel illustrated in FIG. 4 is constituted by a transmission type liquid-crystal cell including the visual side and back side cell substrates 21 and 11 and the electrodes 23 and 13 of transparent layers provided inside the cell substrates 21 and 11 respectively. The glass substrate 1 according to the present invention is used as the back side substrate. Although FIG. 4 shows the case where a reflection layer 6 is disposed on the back surface of the liquid-crystal cell to form a back-light transmission-reflection type liquid-crystal display panel, the present invention may be applied also to a transmission type liquid-crystal display panel without the reflection layer provided.

When the liquid-crystal display device is formed, at least one suitable optical layer such as a polarizer, a phase retarder, a light-diffusing layer, optical path changing means, etc., may be provided on one side of the liquid-crystal cell in accordance with necessity. Further, at least one light source maybe provided on one side surface of the liquid-crystal display panel. Further, a color filter layer may be provided on the other cell substrate than the glass substrate according to the present invention. In this case, the color filter layer is typically provided between the substrate and the electrode in the cell substrate. Although the color filter layer is typically provided in the visual side substrate, the present invention is not limited thereto. Incidentally, in FIG. 4, the reference numeral 4 designates a polarizer; 5, optical path changing means; and 7, a light source.

The polarizer is provided for achieving display using linearly polarized light. The phase retarder is provided for improvement of display quality due to compensation for retardation caused by birefringence of liquid crystal, or the like. Further, the light-diffusing layer is provided for diffusing display light to enlarge the display range, for leveling bright-line-like light emission through the optical path changing means to make luminance uniform, for diffusing light which is transmitted in the liquid-crystal display panel to increase the quantity of light incident on the optical path changing means, etc. On the other hand, the optical path changing means is provided for controlling the optical path of light incident from the light source disposed on one of side surfaces of the liquid-crystal display panel and the optical path of light transmitted in the liquid-crystal display panel and for changing these optical paths into a direction of the thickness of the panel to thereby use the light as display light.

A suitable plate can be used as the polarizer without any particular limitation. From the point of view of obtaining good-contrast-ratio display due to incidence of highly linearly polarized light, etc., a plate high in the degree of polarization may be preferably used. Examples of the preferable polarizer include: an absorption type polarizing film made of an oriented film having a dichromatic material such as iodine or dichromatic dye adsorbed on a hydrophilic macromolecular film such as a polyvinyl alcohol film, a partially formalized polyvinyl alcohol film or a partially saponified ethylene-vinyl acetate copolymer film; a film in which a transparent protective layer is provided on one side or each side of the aforementioned absorption type polarizing film, or the like.

A suitable material such as a resin exemplified above in the description of the resin substrate may be used for forming the transparent protective layer. A material excellent in transparency, mechanical strength, thermal stability, water shielding characteristic, etc. is preferably used. The transparent protective layer can be provided by a system of adhering a film, a system of applying a resin solution, or the like. The polarizer to be used, particularly, the visual side polarizer may be subjected to a non-glare treatment or an anti-reflection treatment to prevent viewing from being disturbed by surface reflection of external light.

In the non-glare treatment, various systems may be used for forming a surface of the polarizer as a fine prismatic structure. Examples of the systems include: a surface roughening system such as a sandblasting system, an embossing system, etc.; a system of mixing transparent particles such as silica particles; and so on. Anti-reflection treatment can be made by a system of forming a coherent vapor deposition film, or the like. Alternatively, non-glare treatment and anti-reflection treatment can be made on a surface structure of fine regularities or by a system of bonding a film having an interference film. Incidentally, two polarizers may be provided on opposite sides of the liquid-crystal panel respectively as shown in FIGS. 2 and 4, or one polarizer may be provided on only one side of the liquid-crystal panel as shown in FIG. 3.

On the other hand, the phase retarder may be formed by use of a suitable plate, such as: a birefringent film obtained in such a manner that a film composed of any suitable resin as listed above in the case of the aforementioned resin substrate is oriented by a suitable system such as uniaxal or biaxial orientation system, or the like; an oriented film of suitable nematic or discotic liquid-crystal polymer or the like; such an oriented film in which the aligned layer is supported by a transparent base material; or the like. Alternatively, the phase retarder may be a heat-shrinkable film the thickness-direction refractive index of which is controlled under the effect of shrinkage power by heating. The compensating phase retarder is generally disposed between the visual-side and/or back-side polarizers and the liquid-crystal cell in accordance with necessity. As the phase retarder, suitable plate may be used in accordance with the wavelength range or the like. In addition, the phase retarder may be used in the form of two or more layers so as to be superposed on each other in order to control optical properties such as a retardation difference or the like.

The light diffusing layer can be provided by a suitable system using a coating layer, a diffusing sheet, or the like, having a similar surface structure of fine prisms to that of the non-glare layer. The light diffusing layer can be formed as an adhesive layer containing transparent particles. The light diffusing layer can be formed as a layer also playing the role for bonding the optical layer such as the polarizer, the phase retarder, or the like, so that reduction in thickness can be achieved. A suitable adhesive agent may be used for the formation of the adhesive layer. The adhesive agent contains, as abase polymer, a suitable polymer such as a rubber polymer, an acrylic polymer, a vinyl-alkyl-ether polymer, a silicone polymer, a polyester polymer, a polyurethane polymer, a polyether polymer, polyamide polymer, a styrene polymer, etc.

Particularly, an adhesive agent excellent in transparency, weather resistance, heat resistance, etc. such as an acrylic polymer adhesive agent containing, as a base polymer, a polymer mainly containing alkyl ether of acrylic acid or methacrylic acid is used preferably. As the transparent particles which may be mixed with the adhesive layer, there can be used one or two members suitably selected from the group consisting of inorganic particles of silica, alumina, titania, zirconia, tinoxide, indiumoxide, cadmiumoxide, antimonyoxide, or the like, each of which has a mean particle size in a range of from 0.5 to 20 $\mu$m and which may be electrically conductive; and organic particles of a crosslinked or non-crosslinked polymer, or the like.

Figure 8:
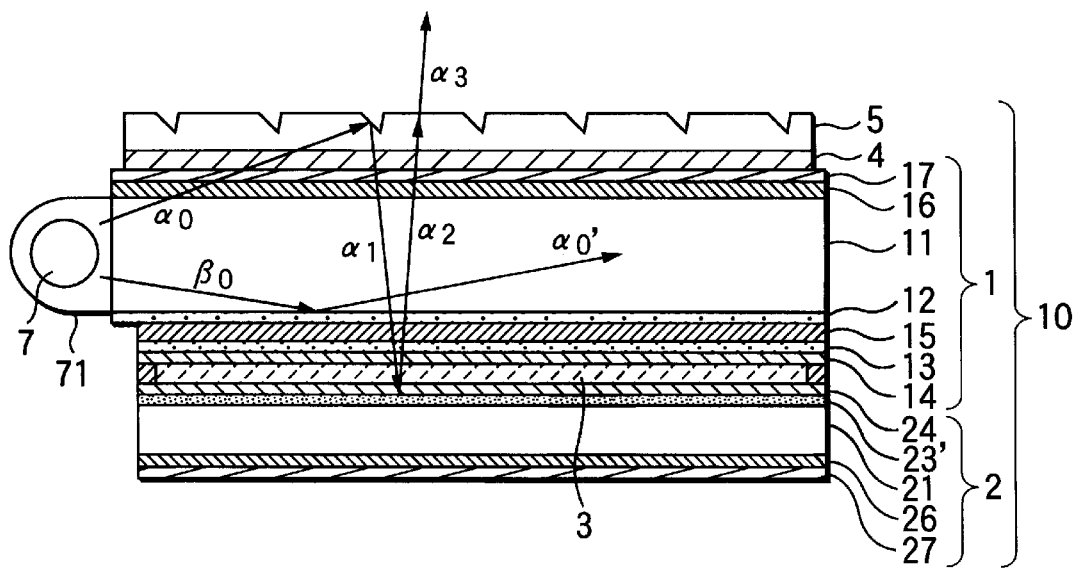
FIG. 8 is an explanatory view of an optical path according to an embodiment of the present invention.

As described above, the optical path changing means is provided so that incident light from the light source 7 disposed on one of side surfaces of the liquid-crystal display panel 10 or transmitted light of the incident light is reflected as represented by the broken-line arrows $\alpha 0$ and $\alpha 1$ in FIG. 8 to thereby change the optical path of the light into the direction of the thickness of the panel, and so that the light is used as illumination light (display light). Hence, the optical path changing means is disposed outside the visual side substrate or the back side substrate in the liquid-crystal display panel 10 as illustrated in FIGS. 2 to 4, so that a front light system or a backlight system is formed.

The optical path changing means 5 can be formed as a layer having any suitable form by which incident light from the light source 7 is reflected so that the optical path of the light can be changed into a predetermined direction as illustrated in FIG. 8. From the point of view of obtaining display light excellent in frontal directivity through the change of the optical path or the like, the optical path changing means is preferably provided as optical path changing means having optical path changing slopes facing the side surface where the light source is disposed, that is, facing the incident side surface, and more preferably as optical path changing means having optical path changing slopes constituted by prismatic structures each shaped like a triangle, a quadrangle or a pentagon in section.

From the point of view of the aforementioned characteristic such as frontal directivity, or the like, the angle of each of the optical path changing slopes with respect to a plane of the liquid-crystal display panel is selected to be preferably in a range of from 35 to 48 degrees, more preferably in a range of from 38 to 45 degrees, further preferably in a range of from 40 to 44 degrees. Further, from the point of view of reducing the thickness of the liquid-crystal display device, the optical path changing means is preferably formed as a repetitive structure of the optical path changing slopes. Although each of the optical path changing slopes may be provided as a protrusion (convex) form, each of the optical path changing slopes may be preferably provided as a groove (concave) form from the point of view of keeping the slope function due to improvement of mar-proofness because the groove form is advantageous over the protrusion form in mar-proofness of the slope or the like. When light sources are disposed on two or more side surfaces of the liquid-crystal display panel so that two or more incident side surfaces are provided, the optical path changing means may be preferably provided as optical path changing means having optical path changing slopes, for example, each constituted by two surfaces of an isosceles triangle in section, in accordance with the number and positions of the incident side surfaces.

In the transmission-reflection type liquid-crystal display device shown in any one of FIGS. 2 through 4, it may be necessary to view display light a3 through the optical path changing means layer 5 as represented by the broken-like arrow $\alpha 2$ in FIG. 8. In this case, the optical path changing means is preferably provided as a structure having gentle slopes or flat surfaces between the optical path changing slopes as shown in FIG. 8 from the point of view of good visibility of display light or the like. Hence, when, for example, the optical path changing means has a structure in which prismatic structures each shaped like a triangle containing an optical path changing slope and a gentle slope in section are repetitively provided so as to be adjacent to one another, the inclination angle of each of the gentle slopes with respect to the panel plane is selected to be preferably not higher than 10 degrees, more preferably not higher than 5 degrees, further preferably not higher than 3 degrees. Further, the inclination angle difference between adjacent ones of the gentle slopes is selected to be small, preferably to be not higher than 1 degree, more preferably to be not higher than 0.3 degree.

When the optical path changing means is made to have a structure having optical path changing slopes as described above, light incident on a side surface or transmitted light of the incident light is reflected by the optical path changing slopes so that the optical path of the light can be changed with good frontal directivity. As a result, brightness in a transmission mode and brightness in a reflection mode can be balanced with each other so as to be favorable to the two modes. However, in the case of a system of scattered reflection on a roughened surface as disclosed in Unexamined Japanese Patent Publication No. Hei. 5-158033, light allowed to be used for display is light which is emitted from the panel by scattering while deviating from the condition of total reflection and which is largely inclined with respect to the frontal direction. Hence, in the scattered reflection system, the light can be hardly used for display effectively. As a result, display in the frontal direction becomes dark. When scattering on the roughened surface type reflection plate is intensified, the quantity of light in the frontal direction is reduced in a reflection mode so as to be unfavorable for display. Hence, in the roughened-surface scattered reflection system, it is difficult to balance brightness in a transmission mode and brightness in a reflection mode with each other.

The optical path changing means can be formed from a suitable material in accordance with the wavelength range of the light source and exhibiting transparency to the wavelength range. Incidentally, in a visible light range, examples of the material are resin, glass, etc. exemplified above in the description of the resin substrate. The optical path changing means is preferably made from a material exhibiting no birefringence or slight birefringence. From the point of view of suppressing the quantity of loss light not allowed to be emitted because of confinement of the light in the panel by interfacial reflection, and from the point of view of supplying light incident on a side surface or transmitted light of the incident light to the optical path changing slopes of the optical path changing means efficiently, the optical path changing means is preferably provided as optical path changing means having a refractive index higher than that of the low-refractive-index transparent layer in the glass substrate. Particularly, the refractive index of the optical path changing means is selected to be higher by 0.05 or more, more particularly by 0.1 or more than that of the low-refractive-index transparent layer.

The optical path changing means can be formed by a cutting method or by any suitable method. Preferred examples of the method for producing the optical path changing means from the point of view of mass production, etc., are: a method in which a thermoplastic resin is pressed against a mold capable of forming a predetermined shape under heating to thereby transfer the shape; a method in which a mold capable of forming a predetermined shape is filled with a hot-melted thermoplastic resin or a resin fluidized by heat or through a solvent; a method in which a fluid resin polymerizable by heat, by ultraviolet rays, by radial rays, or the like, is polymerized in the condition that the fluid resin is cast in a mold capable of forming a predetermined shape or the mold is filled with the fluid resin; or the like. Hence, the optical path changing means may be formed by adding the predetermined form directly to the cell substrate, or the like, or may be formed as a transparent sheet, or the like, having the predetermined form added thereto in advance. Although the thickness of the optical path changing means can be determined suitably, it is generally set to be not thicker than 300 $\mu$m, particularly in a range of from 5 to 200 $\mu$m, more particularly in a range of from 10 to 100 $\mu$m, from the point of view of making the liquid-crystal display device thin.

From the point of view of the efficiency of reflection of the light by the optical path changing slopes and accordingly, from the point of view of improving luminance due to effective use of light incident on a side surface, the optical path changing means is preferably disposed so that the surface where the optical path changing means is formed faces outward as illustrated in FIGS. 2 to 4. When the optical path changing means is formed independently as a transparent sheet, or the like, as described above, it is preferable from the aforementioned point of view that the transparent sheet or the like is bonded to the liquid-crystal display panel through an adhesive layer having a refractive index higher than that of the low-refractive-index transparent layer in the glass substrate, particularly an adhesive layer having a refractive index as equal as the transparent sheet has.

Hence, the refractive index of the adhesive layer can be selected similarly to that of the optical path changing means. The adhesive layer can be made of a suitable transparent adhesive agent. The adhesive agent is not particularly limited in kind. A bonding system using an adhesive layer is preferably used from the point of view of easiness of the bonding treatment, or the like. The adhesive layer can be formed in accordance with the above description and can be provided as a light-diffusing type adhesive layer as described above.

Figure 5:
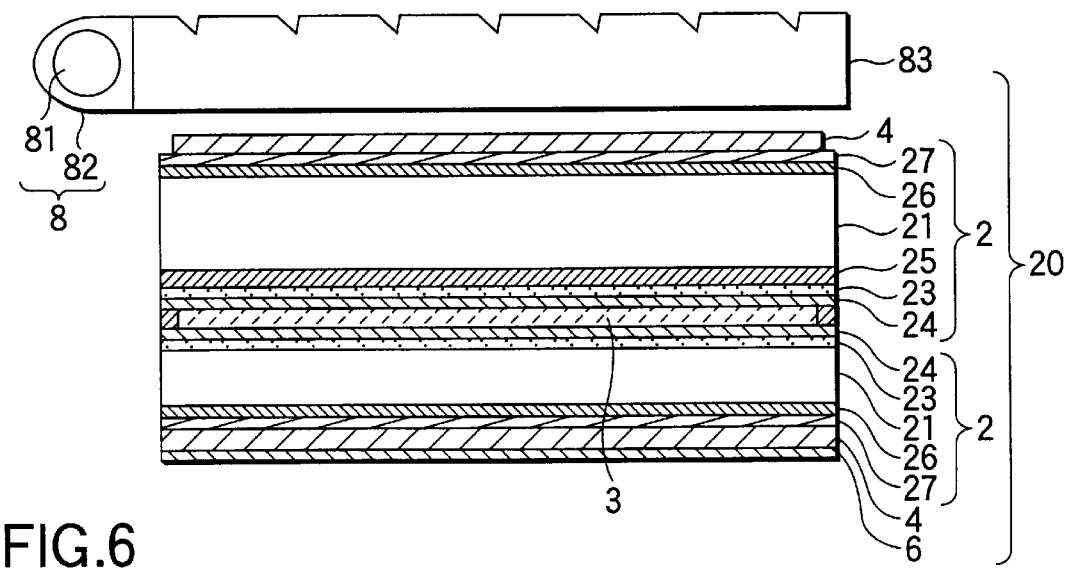
FIG. 5 is a sectional view of an example of a background-art liquid-crystal display device.
Figure 6:
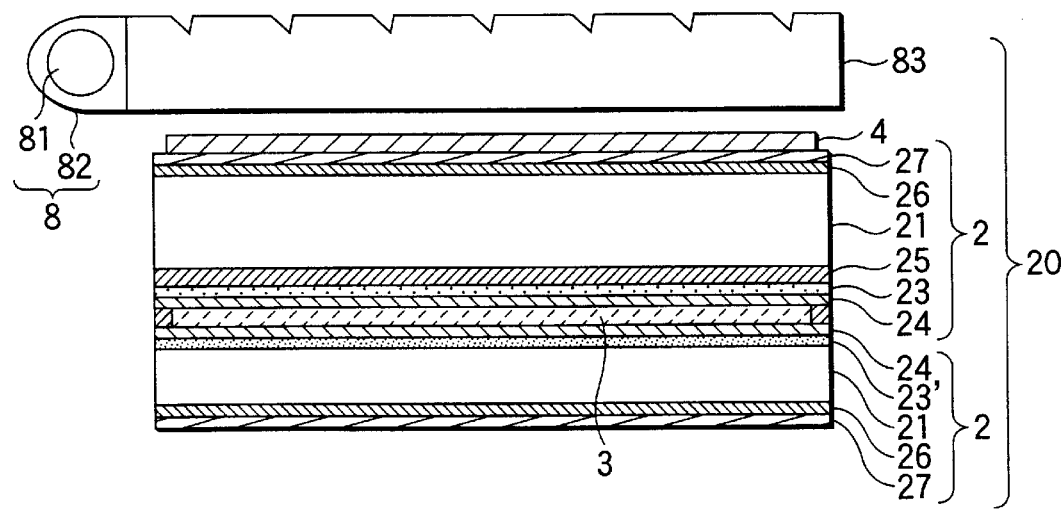
FIG. 6 is a sectional view of another example of the background-art liquid-crystal display device.
Figure 7:
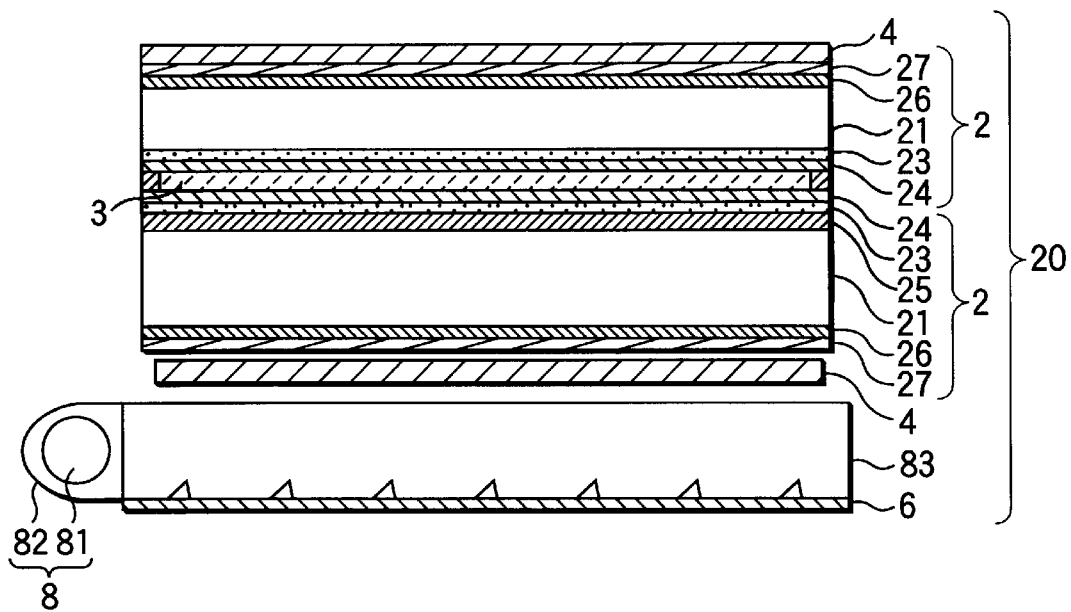
FIG. 7 is a sectional view of a further example of the background-art liquid-crystal display device.

The light source disposed on one of side surfaces of the liquid-crystal display panel is provided so that light used as illumination light for the liquid-crystal display device is made incident on the side surface of the liquid-crystal display panel. Accordingly, by combining the light source with the optical path changing means disposed on the panel, thickness and weight of the liquid-crystal display device can be reduced. Incidentally, as obvious from comparison of the liquid-crystal display panel shown in FIGS. 2 to 4, with the transmission-reflection type liquid-crystal display panel formed in the same manner as described above except that a side light pipe 83 is used as shown in FIGS. 5 to 7, the thickness difference between the optical path changing means 5 and the side light pipe 83 directly appears as the thickness difference between the liquid-crystal display device shown in FIGS. 2 to 4 and the liquid-crystal display device shown in FIGS. 5 to 7. Incidentally, in FIGS. 5 to 7, the reference numeral 25 designates a color filter layer; 8, a light source; 81, a light source; 82, a holder for the light source; and other reference numerals are the same as those shown in FIGS. 2 to 4.

From the point of view of the efficiency of rearward transmitting incident light from the light source, the light source is preferably disposed on one of side surfaces of the cell substrate which is constituted by the glass substrate 1 according to the present invention as illustrated in FIGS. 2 to 4 and which is on the side where the optical path changing means is provided. In this case, further, the preferred system of arranging the light source from the point of view of preventing incident light from the light source from entering the liquid-crystal layer is a system in which the side surface of the cell substrate 1 where the light source is disposed is protruded outward from the side surface of the cell substrate 2. Hence, the planar size of the visual side cell substrate may be different from that of the back side cell substrate. It is not necessary to make the planar size of the visual side cell substrate equal to that of the back side cell substrate. Further, as described above, the thickness of the visual side cell substrate maybe different from that of the back side cell substrate. It is not necessary to make the thickness of the visual side cell substrate equal to that of the back side cell substrate.

When light $\beta 0$ incident on a side surface from the light source 7 is transmitted in the transparent glass plate 11 through the low-refractive-index transparent layer 12 provided in the glass substrate 1 as represented by the broken-line arrows $\beta 0$ and $\alpha 0'$ in FIG. 8, the transmitted light of the incident light is totally reflected on the basis of the refractive index difference between the glass plate 11 and the transparent layer 12. As a result, the transmitted light is efficiently confined in the transparent glass plate. Hence, the transmitted light $\alpha 0'$ is transmitted (rearward) toward an opposite side surface efficiently, so that the transmitted light is supplied uniformly also to the optical path changing slopes of the optical path changing means 5 located far from the light source. Hence, the slopes reflect the light so as to change the optical path of the light as represented by the broken-line arrows $\alpha 1$, $\alpha 2$ and $\alpha 3$, so that uniformity of brightness on the whole display screen can be improved.

As a result, while incident light from the light source or transmitted light of the incident light is transmitted rearward efficiently, the optical path of the transmitted light is changed efficiently into a viewing direction of the liquid-crystal display panel by the optical path changing means so that the light can be used for liquid-crystal display. Hence, a front light mechanism or a backlight mechanism can be formed by a combination of the light source disposed on a side surface and the optical path changing means thin in thickness. Hence, a transmission type or transmission-reflection type liquid-crystal display device thin in thickness, light in weight, bright and excellent in display quality can be formed.

Figure 9:
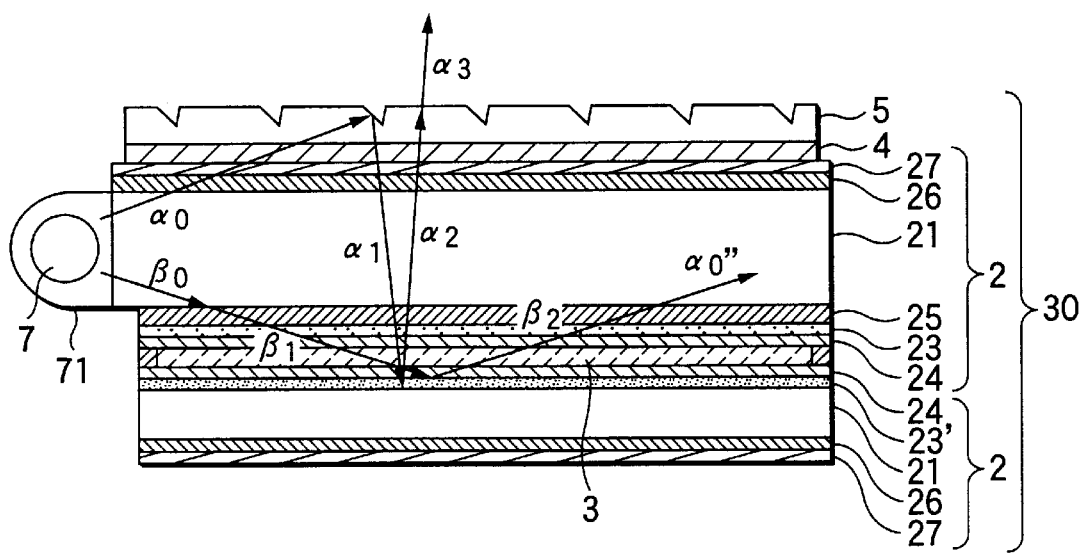
FIG. 9 is an explanatory view of an optical path according to an example of the background art.

If the cell substrate where the light source is disposed has no low-refractive-index transparent layer, the transmitted light enters the color filter layer 25, the liquid-crystal layer 3, or the like, as represented by the broken-line arrows $\beta 0$, $\beta 1$, $\beta 2$ and $\alpha 0''$ in FIG. 9, when the light $\beta 0$ incident on a side surface from the light source 7 is transmitted in the substrate 21. Moreover, the light $\beta 2$ reflected by the electrode 23' serving also as a reflection layer is transmitted through the liquid-crystal layer 3, the color filter layer 25, or the like, again. Hence, the light $\alpha 0''$ transmitted rearward as described above is reduced greatly. Hence, brightness decreases as the position goes farther from the light source, so that luminance varies largely on the whole display screen.

A suitable material may be used as the light source. Preferable examples of the light source may include: a linear light source such as a (cold or hot) cathode-ray tube or the like; a point light source such as a light-emitting diode or the like; an array in which such point light sources are set in a linear or planar array or the like; a combination of a point light source and a linear light pipe through which incident light from the point light source is converted into a linear light source; and so on. The light source may be disposed on at least one side surface of the liquid-crystal display panel. In the case where light sources are disposed on two or more side surfaces, the side surfaces may be used as a combination of opposite side surfaces, or as a combination of side surfaces intersecting lengthwise and crosswise, or as a combination of three or more side surfaces using both the aforementioned combinations.

The light source enables visual recognition of the display in the lighting mode. When visual recognition is made in the reflection mode using external light in the case of a transmission-reflection double liquid-crystal display device, it is unnecessary to switch on the light source. Therefore, the light source is made switchable on/off. As the switching system, any suitable system maybe adopted, or any background-art system may be adopted. Incidentally, the light source may be of a multi-color light emission system which can change over between emission colors. Alternatively, lights with different colors may be emitted from different kinds of light sources.

If it is necessary to do so, as illustrated in FIGS. 2 to 4, the light source 7 may be formed in a combined body in which a suitable assisting means such as a light source holder 71 or the like is provided for encircling the light source 7 to guide divergent light to the side surface of the liquid-crystal display panel. As the light source holder, a suitable reflection sheet which can reflect at least light from the light source may be used. As the reflection sheet, it is possible to use a resin sheet provided with a high reflectance metal thin film, a white sheet, a metal foil sheet, or the like. The light source holder may be used as a retaining means also having a function of encircling the light source in such a manner that end portions of the light source holder are bonded to end portions of upper and lower surfaces of a cell substrate of the liquid-crystal display panel.

As illustrated in FIGS. 2 and 4, a light-reflection layer 6 can be disposed in a suitable position of the liquid-crystal display device as occasion demands. In FIG. 2, the light-reflection layer is provided for reflection and inversion of the front light. In FIG. 4, the light-reflection layer is provided for reflecting and inverting light leaked from the optical path changing means to make the leaked light enter the cell substrate again to thereby improve light-utilizing efficiency and for reflecting light from the liquid-crystal cell side to thereby form a transmission-reflection type liquid-crystal display device. The light-reflection layer can be formed from a suitable material such as a white sheet, or the like, similarly to the background art.

The reflection layer is preferably a high-reflectance reflection layer. Particularly, examples of the preferable reflection layer may include: a coating layer containing powder of a high-reflectance metal such as aluminum, silver, gold, copper, chromium, etc., or alloy powder of such a high-reflectance metal in a binder resin; a metal thin film layer in which the above-mentioned metal or a dielectric multilayer film is deposited by a suitable thin-film forming system such as a vacuum vapor deposition system, a sputtering system, or the like; a reflection sheet having the coating layer or the deposited layer supported by a base material made of a film, or the like; a sheet of metal foil; and so on. The reflection layer is especially preferably used for forming a reflection-transmission type liquid-crystal display device.

The reflection layer to be provided may exhibit a light diffusing function. The reflection layer has a diffuse reflection surface for diffusing the reflected light to thereby attain improvement in frontal directivity. When the diffusing reflection surface is formed by a surface roughening process, the reflection layer can prevent the production of Newton rings due to its close contact with the optical path changing means to thereby improve visibility. Hence, the reflection layer may be simply put on the outer side of the optical path changing means or may be disposed so as to adhere closely thereto by a bonding system, a vapor deposition system, or the like. When the reflection layer is disposed so as to adhere closely to the slopes of the optical path changing means, the reflecting effect can be improved to thereby prevent leaking light almost perfectly to improve viewing angle characteristic and luminance more greatly.

The formation of the light-diffusing type reflection layer can be made by a system, for example, comprising the steps of: forming a surface of a film base material as a fine prismatic structure by a suitable system such as a surface roughening system using sandblasting, matting, or the like, or a particle adding system; and providing a reflection layer on the film base material so that the fine prismatic structure is reflected in the reflection layer. The reflection layer having such a fine prismatic structure to reflect the fine prismatic structure on the surface of the film base material can be formed by depositing a metal on the surface of the film base material by a suitable vapor deposition or plating system such as a vacuum vapor deposition system, an ion-plating system, a sputtering system, or the like.

In the liquid-crystal display device, a larger part of the light incident on the incidence side surface is transmitted rearward through reflection in the liquid-crystal display panel, especially in the cell substrate of the liquid-crystal display panel in accordance with the law of refraction. Hence, while the light is prevented from exiting (leaking) from the surface of the panel, the optical path of the light incident on the optical path changing slopes of the optical path changing means is efficiently changed to the viewing direction with good perpendicular directivity. The other part of the transmitted light is further transmitted rearward by total reflection so as to be incident on the optical path changing slopes on the back. Hence, the optical path of the other part of the transmitted light is efficiently changed to the viewing direction with good perpendicular directivity. As a result, display excellent in uniformity of brightness on the whole display surface of the panel can be achieved.

Accordingly, there can be formed a transmission type or transmission-reflection type liquid-crystal display device which can utilize the light from the light source efficiently and which is bright, easy to view and excellent in display quality.

Incidentally, in the present invention, optical devices or parts such as an optical path changing means, a liquid-crystal cell, a polarizer, a phase retarder, etc. for forming the liquid-crystal display device may be wholly or partially integrally laminated/fixed onto one another or may be disposed to be separable easily from one another. From the point of view of prevention of lowering of contrast based on suppression of interface reflection, or the like, it is preferable that such optical devices or parts are fixed onto one another.

A suitable transparent adhesive layer made of an adhesive agent or the like can be used for the fixing/bonding process. The transparent adhesive layer may contain the aforementioned transparent particles so that the adhesive layer exhibits a diffusing function, or the like. In addition, the aforementioned optical devices or parts, particularly those on the visual side may be made to have ultraviolet absorbing ability, for example, by a system of treating them with an ultraviolet absorbing agent such as salicylic ester compound, benzophenone compound, benzotriazole compound, cyanoacrylate compound, nickel complex compound, or the like.

REFERENCE EXAMPLE 1

A mold processed into a predetermined shape in advance was filled with an ultraviolet-curable acrylic resin dropped by a dropper. A polycarbonate film with a thickness of 60 μm was put quietly on the acrylic resin and brought into close contact with the acrylic resin by a rubber roller to thereby remove surplus resin and air bubbles. The acrylic resin was irradiated with ultraviolet rays by a metal halide lamp so as to be cured. Then, the acrylic resin provided with the polycarbonate film was peeled off from the mold and cut into a predetermined size. Then, the acrylic resin was peeled off from the polycarbonate film. Thus, an optical path changing means sheet with a refractive index of 1.51 was obtained. An adhesive layer with a refractive index of 1.51 was attached to the surface of the optical path changing means sheet in which no optical path changing means was formed. Thus, a transparent sheet was obtained. The transparent sheet was 40 mm wide and 30 mm long. The transparent sheet had prism-like concave portions which formed ridgelines each inclined at an angle of 21 degrees in a widthwise direction and which were disposed continuously at intervals of a pitch of 210 μm. Each of the prism-like concave portions had an optical path changing slope and a steep slope. The inclination angle of each optical path changing slope was about 42 degrees. The vertical angle between each optical path changing slope and a corresponding steep slope was 70 degrees. The projected width of the optical path changing slope on a reference plane was in a range of from 10 to 16 μm. The area of the flat portion in the transparent sheet was not smaller than 10 times as large as the total protected area of the optical path changing slopes and the steep slopes on the reference plane.

REFERENCE EXAMPLE 2

An adhesive layer-containing transparent sheet constituted by optical path changing means itself was obtained in the same manner as in Reference Example 1 except that the mold was replaced by another mold. The transparent sheet was 40 mm wide and 30 mm long. The transparent sheet had prism-like concave portions which had ridgelines each inclined at an angle of 21 degrees in a widthwise direction and which were disposed continuously at intervals of a pitch of 210 μm. Each of the prism-like concave portions had an optical path changing slope and a steep slope. The inclination angle of each optical path changing slope was about 42 degrees. The vertical angle between each optical path changing slope and a corresponding steep slope was 70 degrees. The projected width of the optical path changing slope on a reference plane was in a range of from 13 to 17 μm. The area of the flat portion in the transparent sheet was not smaller than 10 times as large as the total protected area of the optical path changing slopes and the steep slopes on the reference plane.

EXAMPLE 1

Surfaces of a transparent while glass plate with a thickness of 1.2 mm and with a refractive index of 1.52 were washed with neutral detergent and pure water successively. After water was removed from the surfaces of the glass plate by a spin coater, the glass plate was subjected to plasma treatment in an argon atmosphere and magnesium fluoride was vacuum-deposited on one of the surfaces by electron-beam heating. Thus, a low-refractive-index transparent layer with a thickness of 600 nm and with a refractive index of 1.38 was formed on one surface of the glass plate. A color filter layer shaped like red, blue and green stripes and an ITO transparent electrically conductive layer (electrode) formed by sputtering were formed successively on the low-refractive-index transparent layer. Thus, a glass substrate was obtained.

EXAMPLE 2

A glass substrate was obtained in the same manner as in Example 1 except that the thickness of the low-refractive-index transparent layer was changed to 300 nm.

EXAMPLE 3

A glass substrate was obtained in the same manner as in Example 1 except that the thickness of the low-refractive-index transparent layer was changed to 100 nm.

EXAMPLE 4

A glass substrate was obtained in the same manner as in Example 1 except that magnesium fluoride was replaced by silicon oxide to form a low-refractive-index transparent layer with a refractive index of 1.46.

REFERENCE EXAMPLE 3

A glass substrate was obtained in the same manner as in Example 1 except that the low-refractive-index transparent layer was not provided.

REFERENCE EXAMPLE 4

A glass substrate with a thickness of 0.2 mm was obtained in the same manner as in Example 1 except that the low-refractive-index transparent layer and the color filter layer were not provided.

EXAMPLE 5

A transparent electrode of a visual side substrate constituted by a glass substrate according to Example 1 and a transparent electrode of a back side substrate constituted by a glass substrate according to Reference Example 4 were spin-coated with a polyvinyl alcohol solution. The dried films of the polyvinyl alcohol solution were subjected to rubbing treatment. The rubbing surfaces of the dried films were disposed opposite to each other so that the rubbing directions crossed each other perpendicularly. A gap adjustor constituted by spherical glass beads was disposed and the periphery of the gap adjustor was fixed by a sealing material. Then, liquid crystal (ZLI-4792 made by Merck & Co., Inc.) was injected between the dried films to form a TN liquid-crystal cell. A polarizer (NPF EGW1145DU made by Nitto Electric Industrial Co., Ltd.) subjected to an anti-reflection treatment and a non-glare treatment was stuck onto the visual side of the TN liquid-crystal cell, and a reflection type polarizer (NPF EG3228GR made by Nitto Denko Corporation) was stuck onto the back side of the TN liquid-crystal cell. Thus, a normally white reflection type liquid-crystal display panel was obtained. The panel was 45 mm wide and 34 mm long. One side surface of the visual side substrate in a direction of the length thereof was protruded outward by 2 mm from the back side substrate. Incidentally, the transparent electrode in the back side substrate was etched before the rubbing treatment so as to be divided into two.

Then, a cold-cathode tube was disposed on the protruded side surface of the visual side substrate of the panel and encircled by a silver-deposited polyester film. End portions of the film were bonded to upper and lower surfaces of the visual side substrate by a pressure sensitive adhesive double coated tape so that the cold-cathode tube was held and fixed. A transparent sheet obtained in Reference Example 1 was bonded to the visual side upper surface of the panel through an adhesive layer of the transparent sheet so that the optical path changing means was disposed. Thus, a transmission-reflection type liquid-crystal display device was obtained.

EXAMPLE 6

A transmission-reflection type liquid-crystal display device was obtained in the same manner as in Example 5 except that the glass substrate in Example 1 was replaced by the glass substrate in Example 2 to be used as a visual side substrate.

EXAMPLE 7

A transmission-reflection type liquid-crystal display device was obtained in the same manner as in Example 5 except that the glass substrate in Example 1 was replaced by the glass substrate in Example 3 to be used as a visual side substrate.

EXAMPLE 8

A transmission-reflection type liquid-crystal display device was obtained in the same manner as in Example 5 except that the glass substrate in Example 1 was replaced by the glass substrate in Example 4 to be used as a visual side substrate.

COMPARATIVE EXAMPLE 1

A transmission-reflection type liquid-crystal display device was obtained in the same manner as in Example 5 except that the glass substrate in Example 1 was replaced by the glass substrate in Reference Example 3 to be used as a visual side substrate.

EXAMPLE 9

A TN liquid-crystal cell was formed in the same manner as in Example 5 except that the glass substrate in Reference Example 4 was used as a visual side substrate and the glass substrate in Example 1 was used as a back side substrate. Polarizers (NPF EGW1145DU made by Nitto Denko Corporation) were stuck to opposite sides of the TN liquid-crystal cell. Thus, a normally white transmission type liquid-crystal display panel was obtained. Incidentally, in the panel, one side surface of the back side substrate was protruded outward by 2 mm from the visual side substrate and the transparent electrode of the visual side substrate was divided into two by etching. Then, a cold-cathode tube was disposed on the protruded side surface of the back side substrate of the panel and encircled by a silver-deposited polyester film. End portions of the film were bonded to upper and lower surfaces of the back side substrate by a pressure sensitive adhesive double coated tape so that the cold-cathode tube was held and fixed. A transparent sheet obtained in Reference Example 2 was bonded to the back side lower surface of the panel through an adhesive layer of the transparent sheet so that the optical path changing means was disposed. Thus, a transmission type liquid-crystal display device was obtained.

COMPARATIVE EXAMPLE 2

A transmission type liquid-crystal display device was obtained in the same manner as in Example 9 except that the glass substrate in Example 1 was replaced by the glass substrate in Reference Example 3 to be used as a back side substrate.

Evaluation Test

Frontal luminance in a position distanced by 10 mm from the incidence side surface, in the center and in a position distanced by 10 mm from the opposite side surface of the liquid-crystal display device obtained in each of Examples 5 to 9 and Comparative Examples 1 and 2 was measured in a dark room by a luminance meter (BM7 made by Topcon Corp.) under the condition of a visual field of 1 degree in a lighting mode while the cold-cathode tube was switched on in the state that the liquid-crystal cell was supplied with no voltage. Further, frontal luminance in the center of the transmission-reflection type liquid-crystal display device obtained in each of Examples 5 to 8 and Comparative Example 1 was measured in the dark room in an external light mode using a ring-like light source disposed at an azimuth angle of 20 degrees while the cold-cathode tube was switched off.

Results of the measurement were shown in the following Table.

| | Frontal Luminance (cd/m$^2$) | | | |
|---|---|---|---|---|
| | Lighting Mode | | | |
| | Incidence Side Surface | Center | Opposite Side Surface | External Light Mode Center |
| Example 5 | 45 | 41 | 38 | 153 |
| Example 6 | 42 | 36 | 31 | 161 |
| Example 7 | 41 | 34 | 30 | 160 |
| Example 8 | 42 | 34 | 31 | 168 |
| Comparative Example 1 | 40 | 22 | 11 | 172 |

-continued

| | Frontal Luminance (cd/m²) | | | |
|---|---|---|---|---|
| | Lighting Mode | | | |
| | Incidence Side Surface | Center | Opposite Side Surface | External Light Mode Center |
| Example 9 | 327 | 346 | 319 | — |
| Comparative Example 2 | 237 | 121 | 63 | — |

It is apparent from Table that display in each of Examples 5 to 9 was bright in a lighting mode and variation in brightness was small whereas display in each of Comparative Examples 1 and 2 was dark in a lighting mode and variation in brightness was large. It is also apparent from Examples 5 to 8 that characteristic in the incidence side surface portion was improved to make uniformity of brightness high as the thickness of the low-refractive-index transparent layer increased, and that more excellent brightness was obtained as the refractive index difference between the low-refractive-index transparent layer and the substrate increased. It is further apparent that the difference between each of Examples 5 to 8 and Comparative Example 1 was so small in a reflection mode that addition of the low-refractive-index transparent layer had little influence on the reflection mode.

On the other hand, each display device was observed under the condition that the liquid-crystal cell was supplied with a voltage so that a half of the display screen got into a display state. In a lighting mode in each of Examples 5 to 9 and in a reflection mode in each of Examples 5 to 8, good display was obtained without any specific problem. In a lighting mode in each of Comparative Examples 1 and 2, however, display was so dark and variation of brightness was so large that the display was very hard to view. As described above, in accordance with the present invention, by use of the glass substrate containing the low-refractive-index transparent layer, light is prevented from being absorbed into the color filter. Hence, a transmission type or transmission-reflection type liquid-crystal display device having a uniform luminance distribution can be formed. It is apparent that a good-display-quality liquid-crystal display device can be formed because reduction in thickness and weight of the liquid-crystal display device can be achieved while increase in bulk and weight thereof due to the use of a light pipe obtained by a system of combining the optical path changing means with the light source disposed on a side surface is avoided.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A glass substrate comprising:
a transparent glass plate; and
a low-refractive-index transparent layer disposed on said transparent glass plate, said low-refractive-index transparent layer having a refractive index lower than that of said transparent glass plate; and
an electrically conductive layer disposed on said transparent glass plate through said low-refractive-index transparent layer; and
wherein an optical path length based on a product of a thickness of said low-refractive-index transparent layer and a refractive index thereof is not smaller than 100 nm.

2. A glass substrate according to claim 1, wherein said low-refractive-index transparent layer is made of an inorganic dielectric.

3. A glass substrate according to claim 1, wherein said electrically conductive layer is transparent.

4. A glass substrate according to claim 1, further comprising a color filter layer provided between said low-refractive-index transparent layer and said electrically conductive layer.

5. A liquid-crystal display device comprising:
a liquid-crystal display panel including a liquid-crystal cell including a visual side cell substrate, a back side cell substrate, an electrode provided on said visual side cell substrate, an electrode provided on said back side cell substrate, and a liquid crystal layer interposed between said visual side cell substrate and said back side cell substrate which are disposed so that the electrode sides of the two cell substrates face each other, wherein at least one of said visual side and back side cell substrates is constituted by a glass substrate according to claim 1.

6. A liquid-crystal display device according to claim 5, wherein said liquid-crystal panel further includes at least one polarizer provided on one side of said liquid-crystal cell.

7. A liquid-crystal display device according to claim 5, wherein said liquid-crystal display panel further includes at least one light source provided on one of side surfaces of said liquid-crystal display panel, and optical path changing means provided on the outside of one of said visual side cell substrate and said back side cell substrate said optical path changing means being provided for reflecting illumination light incident on said one of said visual side cell substrate and said back side cell substrate from said light source to thereby change an optical path of said light toward the other one of said visual side cell substrate and said back side cell substrate.

8. A glass substrate comprising:
a transparent glass plate; and
a low-refractive-index transparent layer disposed on said transparent glass plate, said low-refractive-index transparent layer having a refractive index lower than that of said transparent glass plate;
an electrically conductive layer disposed on said transparent glass plate through said low-refractive-index transparent layer; and
a color filter layer provided between said low-refractive-index transparent layer and said electrically conductive layer.

9. A liquid-crystal display device comprising:
a liquid-crystal display panel including a liquid-crystal cell including a visual side cell substrate and a back side cell substrate each including an electrode, and a liquid crystal layer interposed between said visual side cell substrate and said back side cell substrate, wherein at least one of said visual side and back side cell substrates is constituted by a glass substrate comprising:

a transparent glass plate; and a low-refractive-index transparent layer disposed on said transparent glass plate, said low-refractive-index transparent layer having a refractive index lower than that of said transparent glass plate;

an electrically conductive layer disposed on said transparent glass plate through said low-refractive-index transparent layer, wherein said electrically conductive layer is said electrode; and a color filter layer provided between said low-refractive-index transparent layer and said electrically conductive layer.

* * * * *